United States Patent [19]
Ostbo

[11] 3,899,819
[45] Aug. 19, 1975

[54] METHOD FOR MANUFACTURING CURVED TUBE SECTIONS

[76] Inventor: John David Bertil Ostbo, Byvagen 38, S-151 52 Sodertalje, Sweden

[22] Filed: Apr. 2, 1973

[21] Appl. No.: 347,030

Related U.S. Application Data

[63] Continuation of Ser. No. 137,160, April 26, 1971, abandoned.

[30] Foreign Application Priority Data
July 16, 1970 Sweden.............................. 9881/70

[52] U.S. Cl. ................... 29/407; 156/122; 156/250; 228/182; 228/155; 29/411
[51] Int. Cl. ............................................ B23k 31/02
[58] Field of Search .......... 29/471.1, 475, 480, 481, 29/426; 156/95, 97, 122, 118, 250

[56] References Cited
UNITED STATES PATENTS

| | | | |
|---|---|---|---|
| 2,349,889 | 5/1944 | Steudel............. | 29/426 X |
| 2,825,431 | 3/1958 | Molt.............. | 29/471.1 X |
| 3,488,766 | 1/1970 | Williams et al.................. | 29/475 X |
| 3,550,253 | 12/1970 | Frey.................... | 29/471.1 |

FOREIGN PATENTS OR APPLICATIONS

| | | |
|---|---|---|
| 1,579,630 | 7/1969 | France |
| 1,602,300 | 3/1970 | Germany |
| 1,602,336 | 5/1970 | Germany |
| 1,125,869 | 3/1962 | Germany |
| 1,294,908 | 5/1969 | Germany |
| 315,377 | 10/1913 | Germany |

*Primary Examiner*—Richard B. Lazarus
*Attorney, Agent, or Firm*—Pollock, Philpitt & Vande Sande

[57] ABSTRACT

A method of manufacturing curved tube sections —especially for use in nuclear reactor plants —is disclosed which comprises fabricating a number of intermediate segments, each closed in the longitudinal direction and having a cross-sectional profile corresponding to a segment of the wall of the ultimately fabricated tube; welding or otherwise joining the intermediate segments into a tube completely closed in its circumferential as well as its longitudinal directions; and subsequently cutting said tube into the desired tube sections required.

5 Claims, 7 Drawing Figures

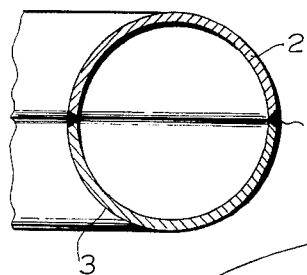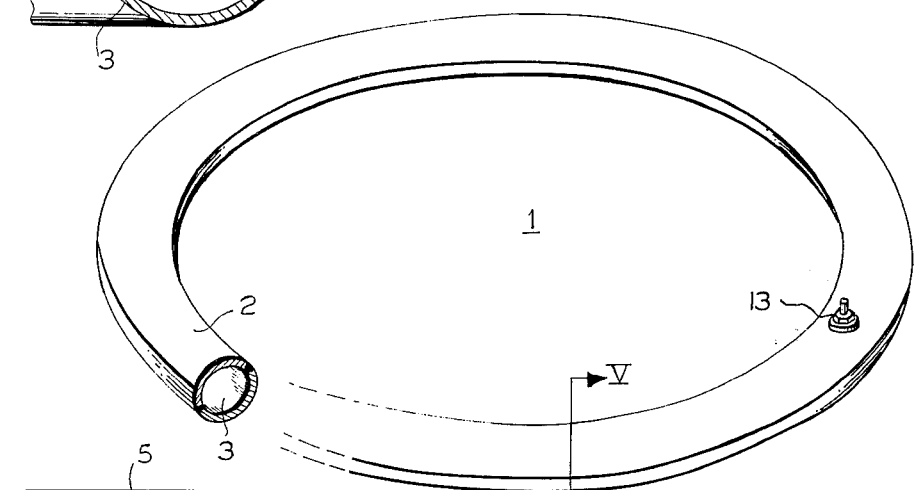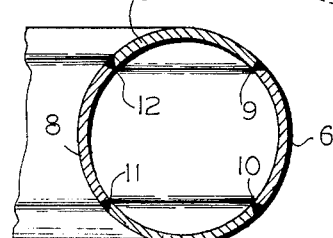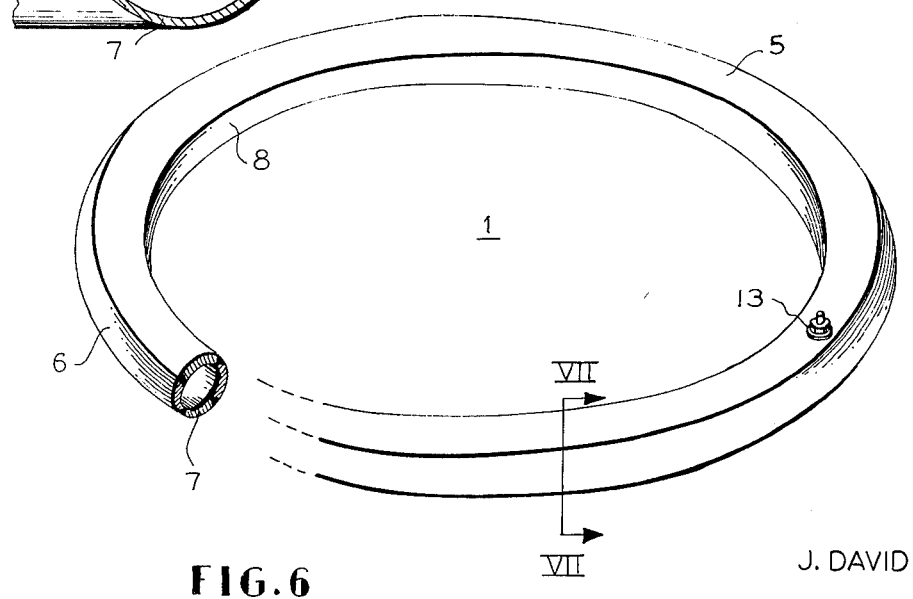

METHOD FOR MANUFACTURING CURVED TUBE SECTIONS

This is a continuation of application Ser. No. 137,160, filed Apr. 26, 1971, and now abandoned.

BACKGROUND OF THE INVENTION

The prior art has, since long, been aware of difficulties in manufacturing curved tube sections, particularly such sections of large dimensions. The classical prior art methods commence with a straight tube section which is transformed into a curved tube section with the use of an internal mandrel or a similar device. However, this method is not practicable when the wall thickness or diameter of the tube is large.

Another known method of manufacturing curved tube sections involves casting or pressing suitably shaped blanks to semi-circular segments, each of which is of a length corresponding to the length of the curved tube section to be manufactured. The resulting curved tube halves are then united, such as by welding, to produce a curved tube section. The problems with this particular method are mainly the manufacturing costs. In manufacturing curved tube sections of differing lengths, even though their radius of curvature may be equal, differing length blanks must be used. This necessitates either a wide variety of automatic machinery or the use of manual methods. In either case, manufacturing costs are high. Also, the necessity for using blanks of different lengths wastes raw material in that it is not always possible to obtain blanks of the exact length required. When larger blanks are obtained, it is necessary to cut them down to size, the remaining material being scrapped. A further problem with the manufacturing method previously outlined relates to pressure testing of the product. Normally, it is necessary to fabricate end pieces and weld or otherwise affix such end pieces to the curved tube section prior to testing it. Subsequent to testing, the end pieces must be removed. Adding and removing these end pieces is wasteful of both time and money.

It does also belong to the art to produce by casting two blanks each of which is of semi-circular cross-section and of annular form, i.e. has the shape of half a torus. The advantage of that method is twofold; the semi-circular profile permits convenient handling of the casting mandrels, and the annular form of each blank makes it possible to machine the surfaces thereof by mounting it for relative rotation in a machine-tool. Upon completion of the machining step each ring half is examined for bleeds, flaws and other casting deficiencies after which such defective ring sectors are cut away and scrapped. From the remaining accepted sectors are then cut pieces of a length corresponding to the lengths of the curved tube sections under manufacture. Next, the cut-out sectors are in the conventional manner pair-wise combined and united, such as by welding. Pressure testing of the completed sections is then carried out individually entailing the inconveniences above referred to.

It is therefore one object of the present invention to provide a method of manufacturing curved tube sections which will minimize manufacturing costs. Another object of the present invention is to provide a method of manufacturing curved tube sections which enables automatic welding machinery to be used in the manufacturing operation with little regard to the ultimate length of the tube section required. A further object is to provide such a method which minimizes waste of raw material during the manufacturing operation. Still another object is to provide a method of manufacturing curved tube sections which minimizes the loss of time and expense in preparing the product for testing. Yet another object of the present invention is to provide a method which meets the foregoing criteria and, at the same time, is capable of producing curved tube sections wherein the wall thickness or the diameter of the tube is large. Another object is to provide a method for manufacturing curved tube sections with a variety of materials. In particular, a study of the following specification will indicate that the present method can be utilized for the manufacture of curved tube sections of a variety of materials such as metal and/or synthetic resins. A still further object of the invention is to provide a method which particularly renders itself for application in cases where the dimensions of the curved tube sections are substantial and the ready-made sections have to be subjected to accurate pressure testing before being approved for installation, such as in conduits in nuclear reactor plants.

BRIEF DESCRIPTION OF THE INVENTION

The present invention relates to a method for manufacturing curved sections of tubes and pipes. According to the present invention a number of intermediate segments are formed, each of the segments being closed in its longitudinal direction and having a cross-sectional profile which corresponds to a segment of the wall of the tube which is to be finally manufactured. A number of these segments are then joined, such as by welding, to form a completely closed tube, closed in both its circumferential and longitudinal directions. And finally the desired tube sections are cut from the previously formed tube. The cuts are made in a plane substantially transverse to the longitudinal axis of the tube and normally the cuts are made in a plane perpendicular to the longitudinal axis of the tube.

By utilizing intermediate segments which are closed in their longitudinal directions, the step of joining a plurality of sections into a closed curved tube can be performed on automatic seam welding machinery, or the like. Once a completely closed tube is formed the product can easily be tested without the addition of the previously required end sections to form an enclosed volume. All that is required is a coupling through the tube wall to pressurize the interior of the already closed tube. Pressure testing the product as a closed tube minimizes time and expense, and thus minimizes the overall cost of manufacturing the final curved tube section. Subsequent to testing, when it is apparent that the longitudinal seams of the product are satisfactory, sections can be formed by cutting. Thus, the order of operation results in a minimal loss of material, in that the only material which is lost is that which is cut away to form a plurality of curved tube sections.

It will be apparent from the foregoing that the instant invention can be applied to methods of manufacturing curved tube sections of a variety of materials, in particular metal or synthetic resins. It will also be apparent that the number and type of segments used to form the closed tube may be varied. When using segments which are tubular in and of themselves, two or more may be joined to form the desired closed circle of tubing. Thus, in such case, the tubular segments may describe half a quarter circles or any other desired fraction of a circle, "circle" being used herein in a general sense to include all continuous shapes whether perfectly round or not. When using arcuate segments which represent only a fraction of the peripheral surface of the completed tube, as viewed in a plane transverse to the longitudinal axis of completed tube, two or more arcuate segments may be used. Such segments may describe a full or partial circle and subtend an arc, viewed in the aforesaid plane, of 180° or any other desired arc, so long as a sufficient number are used to provide the desired closed tube. In view of the capability of using automatic seam welding equipment to unite a plurality of segments into a curved tube it is apparent that the number of segments to be used can be varied to suit the method of fabricating each of the segments. However, normally two segments each covering an arc of 180° are used.

In many embodiments of the present method the intermediate segments are of such shape that they can usually be manufactured by a pressing operation, a special advantage being that the original work piece can be in strip or band form. In addition, it is also possible to use rolling as a forming method for the intermediate segments and, when the loop is circular, pressure turning may also be employed.

BRIEF DESCRIPTION OF THE DRAWINGS

FIGS. 1, 3, 4, and 6 each show a different curved tube which represents an intermediate step according to the method of the present invention in forming a curved tube section; and FIGS. 2, 5, and 7 show cross-sections taken along lines II—II, V—V and VII—VII in FIGS. 1, 3, 4, and 6 respectively.

DETAILED DESCRIPTION OF THE PRESENT INVENTION

Figure 1:
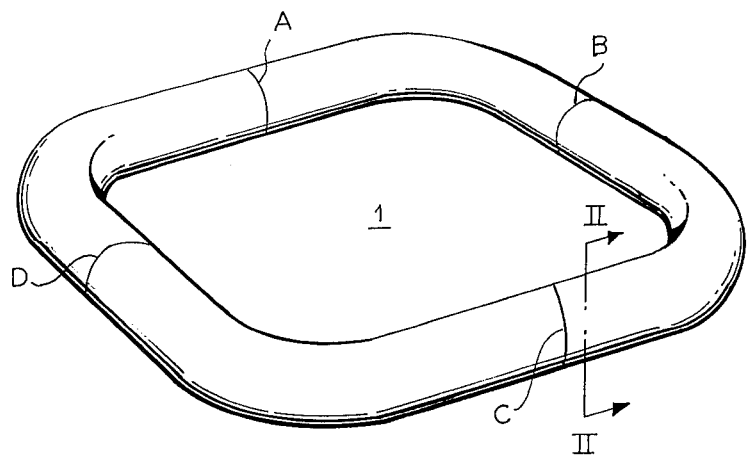

FIGS. 1, 3, 4, and 6 each show how curved tube sections can be obtained by dividing a closed curved tube loop 1, which is closed in both its longitudinal and circumferential directions. The divisions are made along cutting planes which are normally perpendicular to the longitudinal axis of the tube and which have been identified by the letters A, B, C, and D in FIG. 1 and letters E and F in FIG. 3. As shown in FIG. 1, four tube sections are formed, each comprising two legs, with an angle between them of 90°. In contrast, the two tube sections illustrated in FIG. 3 have an included angle of 180°. In FIGS. 4 and 6 no particular division of the tube loop has been shown, and it should be emphasized that it is a characteristic feature of the invention that such a division can be carried out at a late stage in the manufacturing process and that tube sections of arbitrary forms and sizes can be made.

Figure 2:
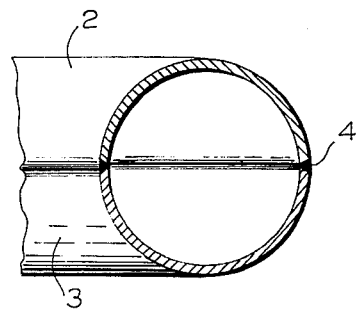
Figure 3:
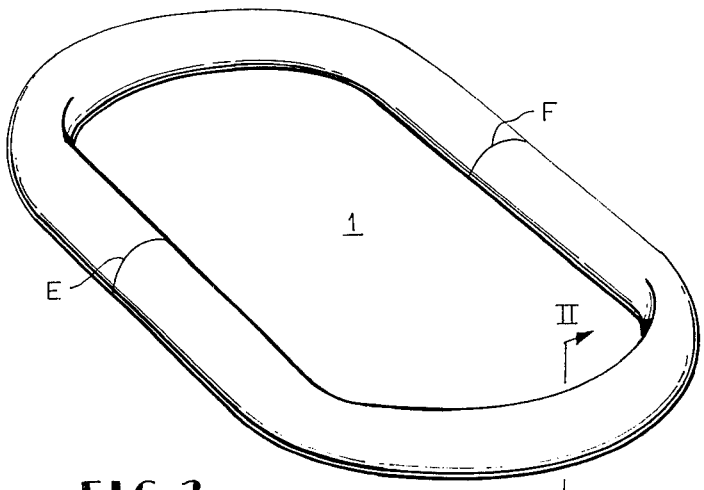

FIG. 2 is a section taken along line II—II of FIG. 1 and FIG. 3. FIG. 5 is a section taken on lines V—V of FIG. 4. Both the cross-sectional views of FIGS. 2 and 5 show that the tubes, of FIGS. 1, 3, and 4 comprise two tube segments, each closed in its longitudinal direction and semi-circular profile. These tube segments are identified, in FIGS. 2 and 4 as segments 2 and 3. Each of the segments are joined together by a welded seam 4. In contrast, FIG. 6 and the cross-section thereof, FIG. 7 illustrate an embodiment where the number of tube segments is four, that is 5, 6, 7, and 8. These are joined together by welded seams 9, 10, 11, 12. Each of these tube segments is of such a shape that it can be manufactured by a pressing operation, and this illustrates one particular advantage of the present invention. The starting material for this pressing operation can be in strip or band form.

The starting material is first formed into a closed loop, in the ultimate longitudinal direction of the curved tube section that is to be formed. Subsequently it is rolled so that its cross-section is of a proper shape, that is semi-circular if two segments are to be used to form a tube, or other desired shape, depending on the number of segments which will be used to form a closed tube. Subsequently a closed tube, closed both in the longitudinal and circumferential directions is formed by joining a plurality of tube segments. The segments are joined, such as by seam welding, in the longitudinal direction of the closed tube. At this point, suitable connections, such as 13, shown in FIGS. 4 and 6 are applied to the closed loop for pressure testing purposes. This illustrates another particular advantage of the present invention in that this is the only step required prior to actual pressure testing of the product.

As has been pointed out above the prior art required the use of temporary closure members, such as discs, to be welded to the ends of the previously formed tube sections before they could be pressure tested. Subsequent to pressure testing, the prior art required removing the discs. The present invention eliminates both these operations and the only operation required prior to testing, is the provision of a suitable connection, such as 13. Subsequent to the actual pressure tests the closed tube is divided into a plurality of curved tube sections by a mechanical operation such as sawing or burning. Again this illustrates a further advantage of the present invention in that the only material lost during the final step corresponds to the width of material cut away from the curved tube to form the curved tube sections.

The foregoing invention finds substantial use in manufacturing curved tube sections when either the wall thickness is large or the tube diameter itself is large, of the order of magnitude of 10 feet.

From the foregoing it will also be apparent, to those of ordinary skill in the art, that while the specification mentions cutting a plurality of tube sections from a curved closed tube on a plane perpendicular to the longitudinal axis of the tube, it should be clear that the plane of cutting can be varied as desired.

What is claimed is:

1. A method of manufacturing curved tube sections of a rigid material, comprising in sequence the steps of,
   a. manufacturing by plastic deformation of flat sheet metal stock a plurality of tube segments, each of said tube segments having a cross-section which comprises a portion of a circle,
   b. joining by welding said segments into a tubular loop completely closed in both longitudinal and circumferential directions, each tube segment corresponding to a portion of the cross-section of said loop, and said loop being circular in cross-section, and then
   c. dividing said loop into a plurality of tube sections by cutting along planes transverse to said longitudinal direction.

2. The method of claim 1 in which said step of manufacturing by plastic deformation comprises pressure turning.

3. The method of claim 1 in which said step of manufacturing by plastic deformation comprises pressing.

4. The method of claim 1 in which said step of manufacturing by plastic deformation comprises rolling.

5. The method of claim 1 in which said loop is subjected to pressure testing prior to the step of dividing said loop into a plurality of tube sections.

* * * * *